United States Patent
Lee et al.

(10) Patent No.: US 7,903,784 B2
(45) Date of Patent: Mar. 8, 2011

(54) APPARATUS AND METHOD OF NARROW BAND X-RAY FILTERING

(75) Inventors: Jong Ha Lee, Hwaseong-si (KR); Dong Goo Kang, Suwon-si (KR); Sung Su Kim, Yongin-si (KR); Young Hun Sung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 12/457,639

(22) Filed: Jun. 17, 2009

(65) Prior Publication Data

US 2010/0111262 A1     May 6, 2010

(30) Foreign Application Priority Data

Oct. 31, 2008   (KR) ........................ 10-2008-0107834

(51) Int. Cl.
 *G21K 1/06*     (2006.01)
(52) U.S. Cl. .......................................... 378/84; 378/156
(58) Field of Classification Search .................... 378/84, 378/85, 145, 146, 156, 157
See application file for complete search history.

(56) References Cited

U.S. PATENT DOCUMENTS

| 2004/0008332 A1* | 1/2004 | Nakaya et al. .................. 355/53 |
| 2006/0239404 A1* | 10/2006 | Udpa et al. ...................... 378/62 |
| 2008/0030842 A1* | 2/2008 | Mangrum et al. ............ 359/291 |
| 2008/0237490 A1* | 10/2008 | Lee et al. .................. 250/492.1 |

FOREIGN PATENT DOCUMENTS

| KR | 10-2003-0089275 | 11/2003 |
| KR | 10-2005-0069701 | 7/2005 |
| KR | 10-2007-0028905 | 3/2007 |

\* cited by examiner

*Primary Examiner* — Hoon Song
(74) *Attorney, Agent, or Firm* — Staas & Halsey LLP

(57) ABSTRACT

Disclosed are an apparatus and method of filtering a narrow band X-ray. The apparatus includes a micro filter array to configure a plurality of micro filters in an array, a filter array storing unit to store a filter table having information about an angle of each of the plurality of micro filters within the micro filter array, and a control unit to retrieve the filter table to ascertain the angle of each of the plurality of micro filters. The control unit also controls an angle between each of the plurality of micro filters and a panel supporting the plurality of micro filters to be the ascertained angle, and filters and output a received broadband polychromatic X-ray to be the narrow band X-ray.

6 Claims, 5 Drawing Sheets

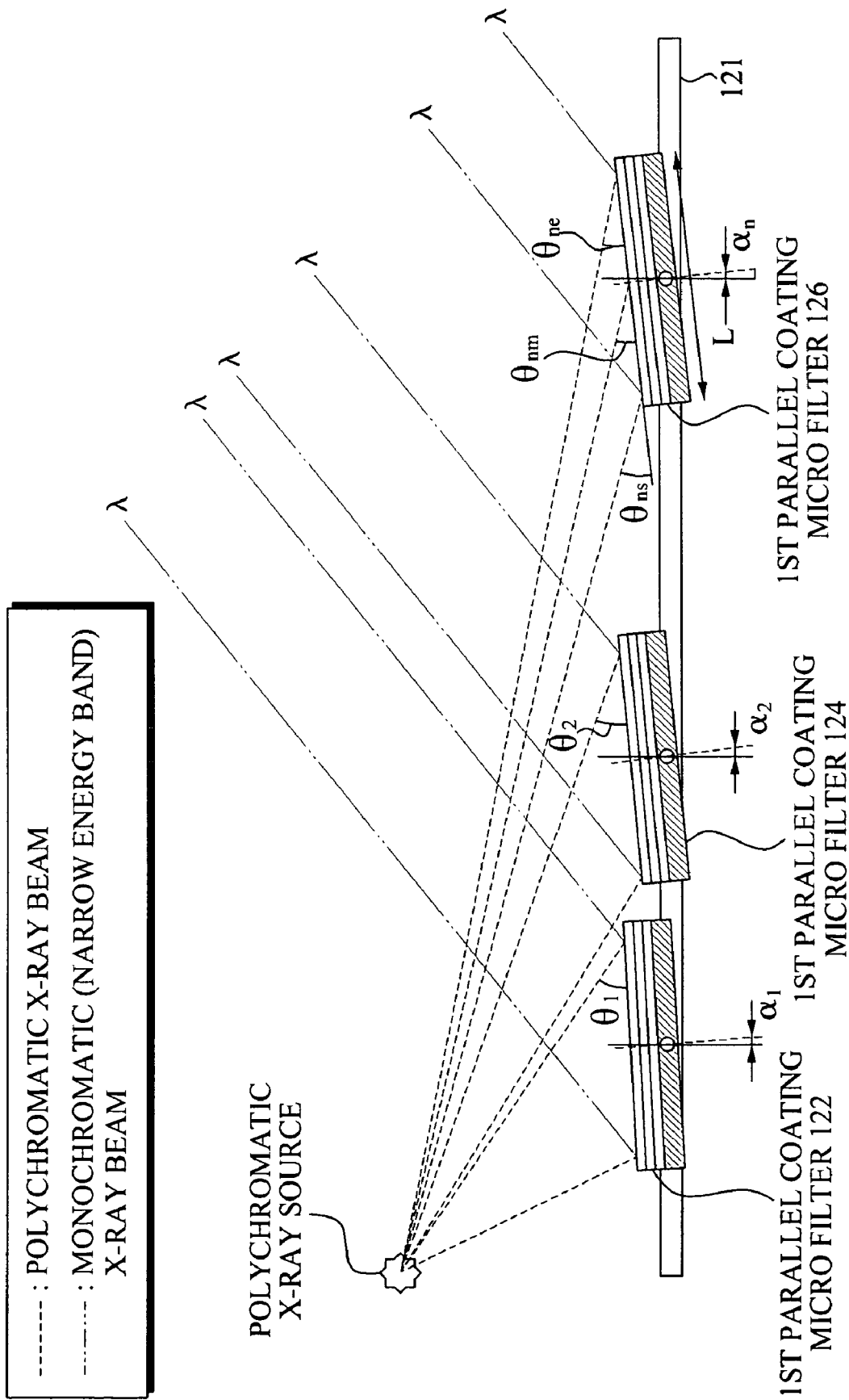

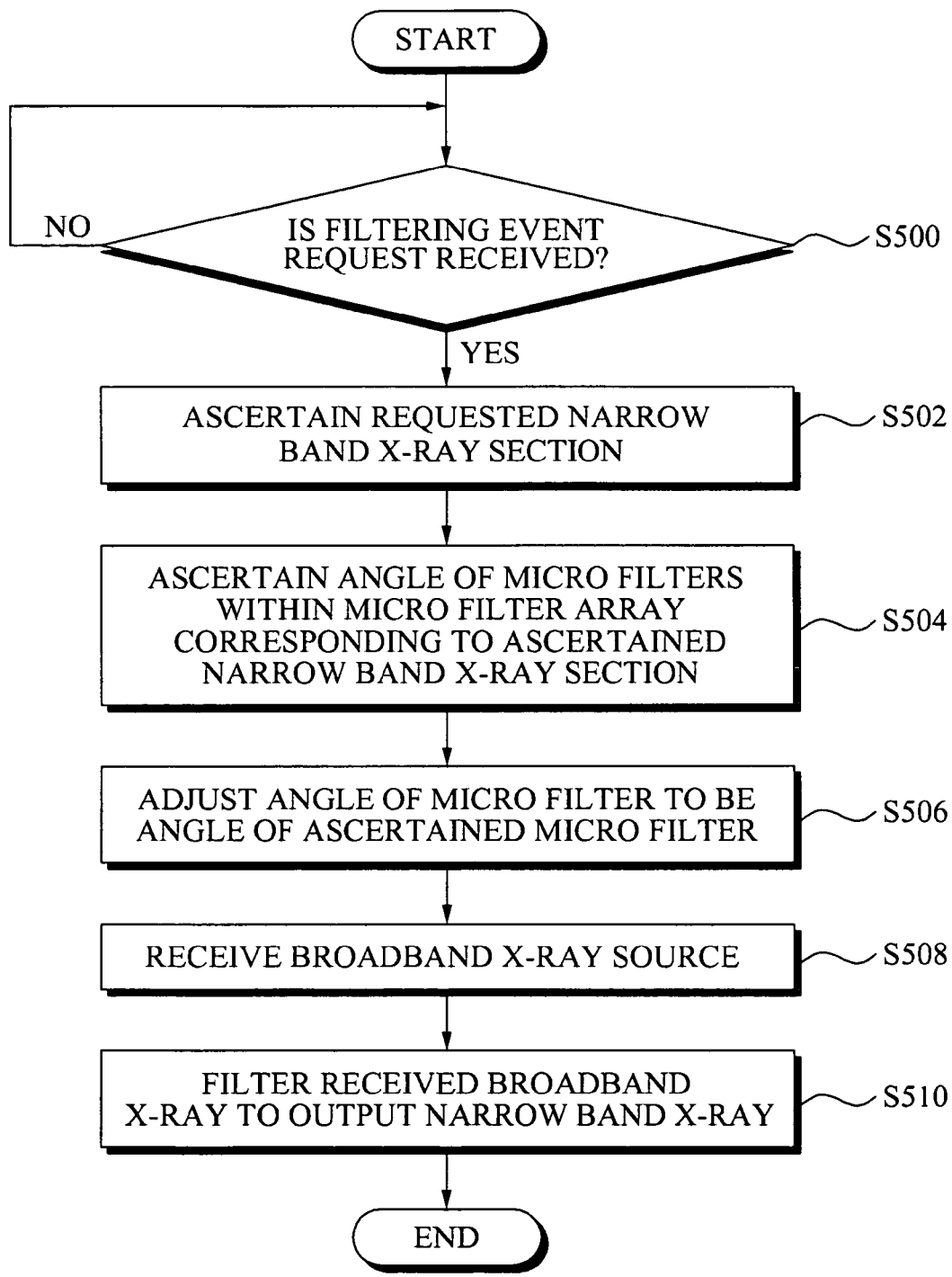

APPARATUS AND METHOD OF NARROW BAND X-RAY FILTERING

CROSS-REFERENCE TO RELATED APPLICATION

This application claims the benefit of Korean Patent Application No. 10-2008-0107834, filed on Oct. 31, 2008, in the Korean Intellectual Property Office, the disclosure of which is incorporated herein by reference.

BACKGROUND

1. Field

Example embodiments relate to an apparatus and method of filtering a narrow band X-ray, and more particularly, to an apparatus and method of filtering a narrow band X-ray in which a plurality of micro filters configured in an array may be controlled to filter a broadband polychromatic X-ray to be a narrow X-ray.

2. Description of the Related Art

An X-ray may be widely used for obtaining medical information of a patient in a hospital, and for research purposes in a laboratory, or obtaining security information of passengers or goods in an airport.

A general X-ray generator used for generating the above-mentioned X-ray may have a structure in which electrons generated in a filament of a cathode are collided with a target of an anode to thereby generate an X-ray. The generated X-ray may be adjusted depending on materials and characteristics of a subject, and images may be created by the X-ray passing through the subject onto a detector installed behind the subject.

In general, an X-ray generated by the X-ray generator may be a broadband polychromatic X-ray. In the polychromatic X-ray, a strength of a radiation and an energy strength of light quantum may vary according to each of frequency bands. As a result, when photographing the subject using the polychromatic X-ray, there arise problems in that images of the subject may be not be clear due to a noise phenomenon of X-rays with different frequencies. Thus, optimum images based on the materials or characteristics of the subject may be not outputted, and an unnecessarily large amount of radiation may be irradiated to the subject. In particular, in the case of a human body, problems due to excessive radiation exposure may be generated.

Accordingly, there is a need for a filtering method corresponding to a specific monochromatic frequency or selecting only a narrow band X-ray in accordance with the monochromatic frequency.

As a method of filtering the narrow band X-ray, a method of using a graded multilayer coated-filter may be given. The graded multilayer coated-filter may apply coating with different thicknesses depending on a location of the filter, thereby selecting the narrow band X-ray. However, the graded multilayer coated-filter may need precision for coating with different thicknesses depending on the location of the filter, and a corresponding separate filter may be required to output a narrow band X-ray of another band.

SUMMARY

Example embodiments may provide an apparatus and method of filtering a narrow band X-ray.

Example embodiments may also provide an apparatus and method of filtering a narrow band X-ray in which a plurality of micro filters configured in an array may be controlled to filter a broadband polychromatic X-ray beam to be a narrow X-ray.

Additional aspects will be set forth in part in the description which follows and, in part, will be apparent from the description, or may be learned by practice of the invention.

According to example embodiments, there may be provided an apparatus to filter a narrow band X-ray, the apparatus including: a plurality of micro filters in an array; a panel supporting the micro filter; a filter array storing unit to store a filter table having information about an angle of each of the plurality of micro filters; and a control unit to retrieve the filter table to ascertain the respective angle of each of the plurality of micro filters, to control an angle between each of the plurality of micro filters and the panel to be the ascertained angle, and to filter and output a received broadband polychromatic X-ray to be the narrow band X-ray.

In this instance, the micro filters are coated such that the micro filters reflect only a narrow band X-ray having a predefined band from the broadband polychromatic X-ray. Also included is a filter adjustment unit to adjust the angle of each of the plurality of micro filters according to the control of the control unit.

Also, the filter table may include an angle of each of the plurality of micro filters corresponding to each of the predefined bands of the narrow band X-ray.

According to another example embodiment, there may be provided a method of filtering a narrow band X-ray, the method including: ascertaining a requested narrow band X-ray section of a broadband X-ray; retrieving a filter table to ascertain an angle of each of a plurality of micro filters corresponding to the requested narrow band X-ray section; adjusting an angle between the plurality of micro filters and a panel supporting the plurality of micro filters to be the ascertained angle; and receiving a broadband polychromatic X-ray, and filtering the received broadband polychromatic X-ray to be the narrow band X-ray using the adjusted micro filters.

In this instance, the plurality of micro filters may be coated so that only the narrow band X-ray having a predefined energy is reflected from the broadband.

Also, the filter table may include an angle of each of the plurality of micro filters corresponding to each of predefined bands of the narrow band X-ray section.

BRIEF DESCRIPTION OF THE DRAWINGS

These and/or other aspects of example embodiments will become apparent and more readily appreciated from the following description, taken in conjunction with the accompanying drawings of which:

FIG. 4 is a diagram illustrating an example of adjusting and filtering a micro filter array in an apparatus of filtering a narrow band X-ray according to example embodiments; and FIG. 5 is a flowchart illustrating a process of filtering a narrow band X-ray in an apparatus of filtering a narrow band X-ray according to example embodiments.

DETAILED DESCRIPTION

Figure 1:
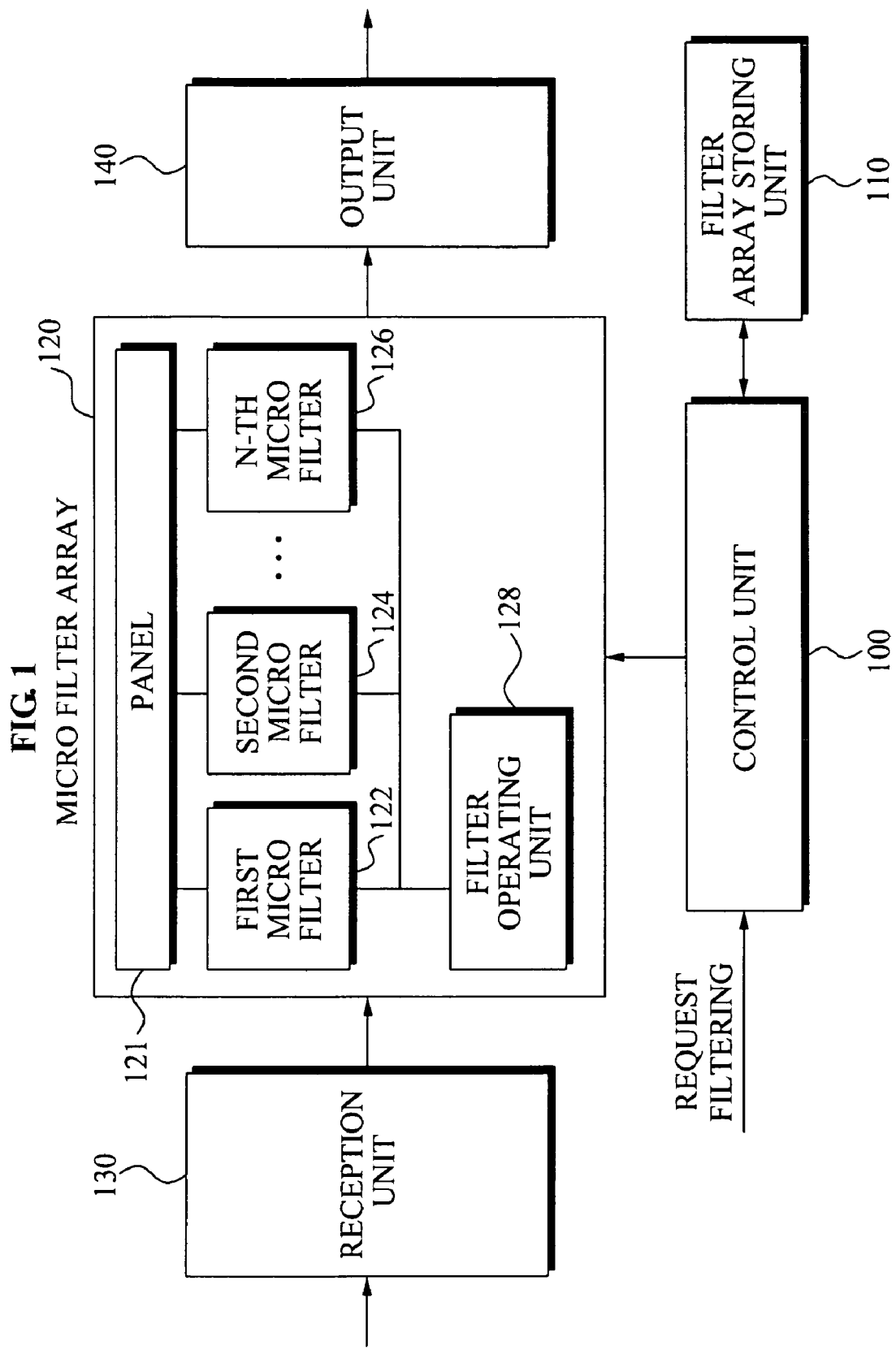
FIG. 1 is a diagram illustrating a configuration of an apparatus of filtering a narrow band X-ray according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 is a diagram illustrating a configuration of an apparatus of filtering a narrow band X-ray according to example embodiments.

Referring to FIG. 1, the apparatus of filtering the narrow band X-ray according to the present example embodiments may include a control unit 100, a filter array storing unit 110, a micro filter array 120, a reception unit 130, and an output unit 140.

The reception unit 130 may receive a broadband polychromatic X-ray, and provide the received broadband polychromatic X-ray to the micro filter array 120.

The micro filter array 120 may filter the broadband polychromatic X-ray received from the reception unit 130 to be the narrow band X-ray, and provide the filtered narrow band X-ray to the output unit 140. The micro filter array 120 may include a plurality of micro filters 122, 124, and 126 configured in an array, and a filter operating unit 128. Here, the filter operating unit 128 may adjust an angle of the plurality of micro filters 122, 124, and 126 to be an angle outputting a narrow band X-ray according to control of the control unit 100.

The micro filter array 120 may be configured as in FIG. 2 below, and the plurality of micro filters 122, 124, and 126 may be configured as in FIG. 3 below.

Figure 2:
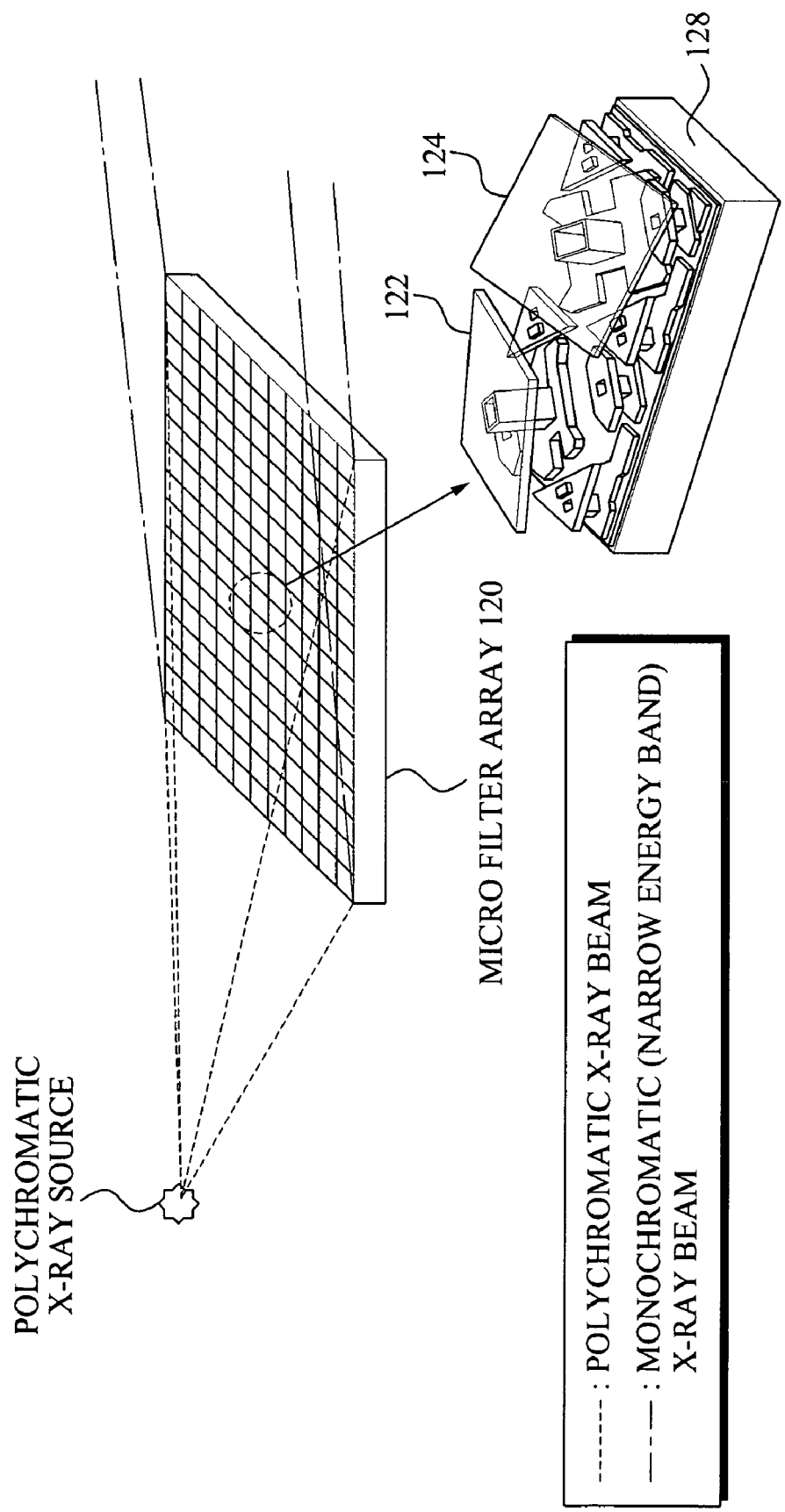
FIG. 2 is a diagram illustrating a configuration of a micro filter array in an apparatus of filtering a narrow band X-ray according to example embodiments.

FIG. 2 is a diagram illustrating a configuration of a micro filter array in an apparatus of filtering a narrow band X-ray according to example embodiments. The micro filter array 120 according to the present example embodiments may be configured in an array of the plurality of micro filters 122, 124, and 128. The filter operating unit 128 may adjust an angle of the plurality of micro filters 122, 124, and 128 to be an angle reflecting the narrow band X-ray.

Figure 3:
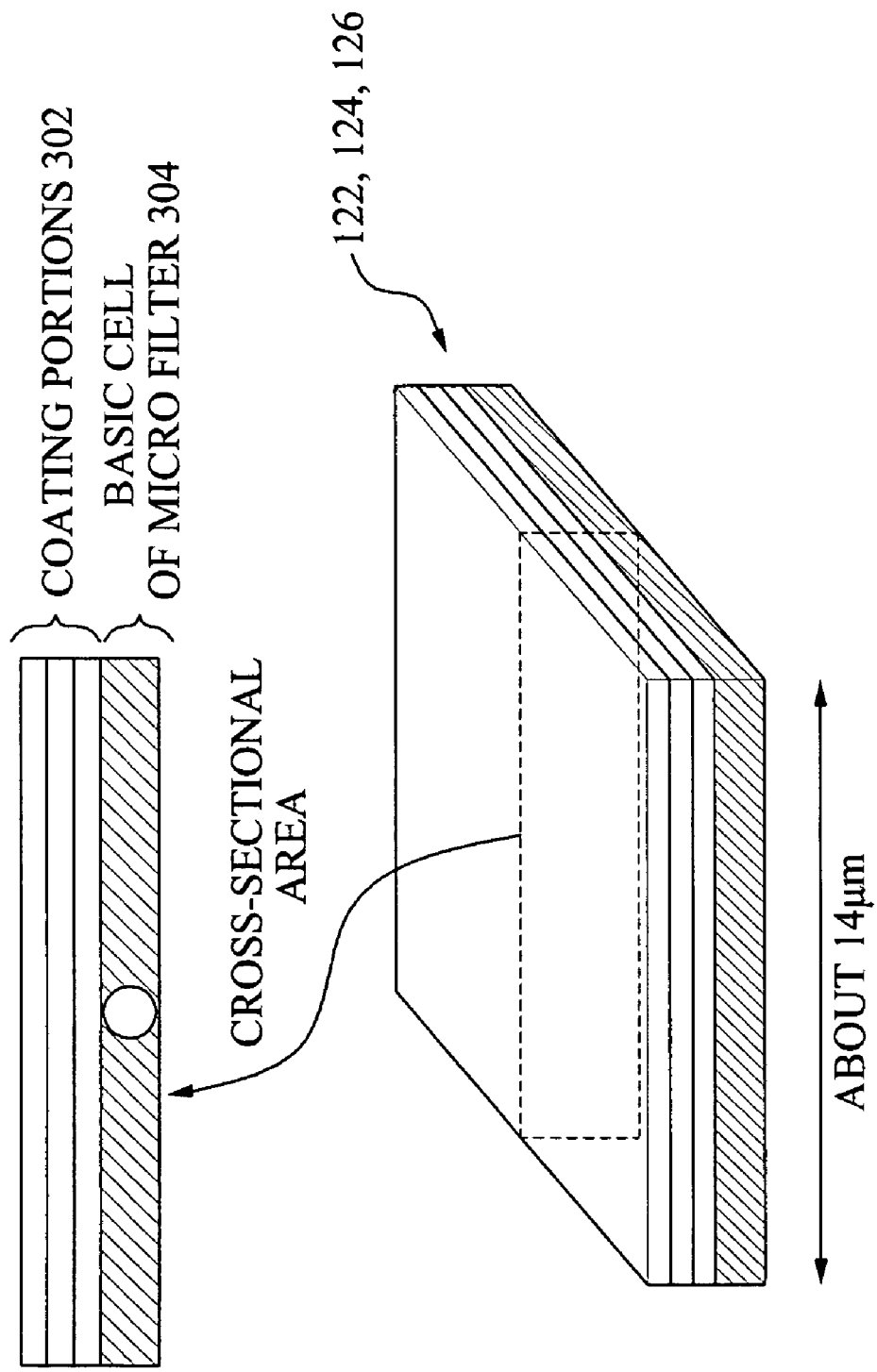
FIG. 3 is a diagram illustrating a configuration of a micro filter in an apparatus of filtering a narrow band X-ray according to example embodiments.

FIG. 3 is a diagram illustrating a configuration of a micro filter in an apparatus of filtering a narrow band X-ray according to example embodiments. The plurality of micro filters 122, 124, and 126 may include a parallel multilayer coating portion 302 reflecting an X-ray and a basic cell 304 of a micro filter at its cross-sectional view. The basic cell 304 may be made of a material that may block the X-ray.

The parallel multilayer coating portion 302 may be a coating portion that may reflect only a narrow band X-ray having a certain energy when the broadband polychromatic X-ray enters at a significantly small incident angle of about 0.5 degrees or less according to Bragg's law.

A single micro filter may have a small size by which the entering broadband polychromatic X-ray is considered as a parallel beam. Accordingly, a size of the plurality of micro filters 122, 124, and 126 may be determined to have an optimum size based on tests.

According to the present example embodiments, the size of the plurality of micro filters 122, 124, and 126 may be about 14 μm, and the micro filters 122, 124, and 126 having a smaller size than 14 μm using an existing technique may be manufactured.

The output unit 140 may output the narrow band X-ray provided from the micro filter array 120.

The filter array storing unit 110 may store a filter table having information about each angle of the plurality of micro filters 122, 124, and 126 included in the micro filter array 120 corresponding to the outputted narrow band X-ray.

The control unit 100 may retrieve the filter table of the filter array storing unit 110 when a filtering of narrow band X-ray is requested, and ascertain each angle of the micro filters 122, 124, and 126 corresponding to the requested narrow band X-ray. Next, the control unit 100 may control an angle between each of the plurality of micro filters 122, 124, and 126 and a panel 121 supporting the plurality of micro filters 122, 124, and 126 to be the ascertained angle. For example, the control unit 100 may control the micro filter array 120 to be a narrow band X-ray requested as in an example of FIG. 4.

FIG. 4 is a diagram illustrating an example of adjusting and filtering a micro filter array in an apparatus of filtering a narrow band X-ray according to example embodiments. Referring to FIG. 4, each angle of the micro filters 122, 124, and 126 may be adjusted so as to reflect an entering broadband polychromatic X-ray to be the narrow band X-ray.

Hereinafter, a method of filtering a narrow band X-ray configured as the above will be described in detail with reference to FIG. 5.

FIG. 5 is a flowchart illustrating a process of filtering a narrow band X-ray in an apparatus of filtering a narrow band X-ray according to example embodiments.

Referring to FIG. 5, in operation S500, the apparatus of filtering a narrow band X-ray according to the present example embodiments may receive a filtering event request. In operation S502, the apparatus may ascertain a requested narrow band X-ray section. In operation S504, the apparatus may retrieve a filter table of the filter array storing unit 110, and ascertain each angle of the micro filters 122, 124, and 126 corresponding to the requested narrow band X-ray section. In operation S506, the apparatus may ascertain an angle between the micro filters 122, 124, and 126 and a panel 121 supporting the micro filters 122, 124, and 126 to be the ascertained angle.

Next, in operation S508, the apparatus may receive a broadband polychromatic X-ray, that is, an X-ray source. In operation S510, the apparatus may filter the broadband polychromatic X-ray to be the narrow band X-ray using an adjusted micro filter array, and output the filtered X-ray.

As described above, the apparatus and method of filtering the narrow band X-ray according to the present example embodiments may control the plurality of micro filters, thereby generating a point-focused monochromatic X-ray beam that is focused into a single point or several points from a polychromatic X-ray entering a state of becoming spread. The apparatus and method of filtering the narrow band X-ray according to the present example embodiments may be utilized in generating phase contrast X-ray images that may act as another type in X-ray image diagnosis, or in treatments utilizing an X-ray.

The apparatus and method of filtering the narrow band X-ray according to the present example embodiments may control the plurality of micro filters configured in an array to thereby filter a broadband polychromatic X-ray to be a narrow X-ray, so that the micro filter array may facilitate production of filters in comparison with the graded multilayer coated filter, facilitate output conversion of various narrow band X-rays, and enable precise output control to the requested narrow band X-ray.

Although an embodiment has been shown and described, the present disclosure is not limited to the described example embodiment. Instead, it would be appreciated by those skilled in the art that changes may be made to this example embodi-

What is claimed is:

1. An apparatus to filter a narrow band X-ray, the apparatus comprising:
 a plurality of micro filters in an array;
 a panel supporting the micro filters;
 a filter array storing unit to store a filter table having information about an angle of each of the plurality of micro filters; and
 a control unit to retrieve the filter table to ascertain the respective angle of each of the plurality of micro filters, to control an angle between each of the plurality of micro filters and the panel to be the ascertained angle, and to filter and output a received broadband polychromatic X-ray to be the narrow band X-ray.

2. The apparatus of claim 1, wherein the micro filters are coated such that the micro filters reflect only a narrow band X-ray having a predefined band from the broadband polychromatic X-ray; and
 a filter adjustment unit to adjust the angle of each of the plurality of micro filters according to the control of the control unit.

3. The apparatus of claim 1, wherein the filter table includes an angle for each of the plurality of micro filters corresponding to each of the predefined bands of the narrow band X-ray.

4. A method of filtering a narrow band X-ray, the method comprising:
 ascertaining a requested narrow band X-ray section of a broadband X-ray;
 retrieving a filter table to ascertain an angle of each of a plurality of micro filters corresponding to the requested narrow band X-ray section;
 adjusting an angle between the plurality of micro filters and a panel supporting the plurality of micro filters to be the ascertained angle; and
 receiving a broadband polychromatic X-ray, and filtering the received broadband polychromatic X-ray to be the narrow band X-ray using the adjusted micro filters.

5. The method of claim 4, further comprising coating the plurality of micro filters such that only the narrow band X-ray having a predefined energy is reflected from the broadband.

6. The method of claim 4, wherein the filter table includes an angle of each of the plurality of micro filters corresponding to each of predefined bands of the narrow band X-ray section.

* * * * *